US008967185B2

(12) United States Patent
Fernandes et al.

(10) Patent No.: US 8,967,185 B2
(45) Date of Patent: Mar. 3, 2015

(54) JOINT COVER WITH MANIFOLD FOR DUCT LEAK DETECTION SYSTEM

(75) Inventors: Leslie Fernandes, La Canada, CA (US); Arnaud Amy, Los Angeles, CA (US)

(73) Assignee: Senior IP GmbH, Schaffhausen (CH)

( * ) Notice: Subject to any disclaimer, the term of this patent is extended or adjusted under 35 U.S.C. 154(b) by 412 days.

(21) Appl. No.: 12/840,905

(22) Filed: Jul. 21, 2010

(65) Prior Publication Data

US 2012/0018014 A1    Jan. 26, 2012

(51) Int. Cl.

| G01M 3/00 | (2006.01) |
|---|---|
| F16L 23/04 | (2006.01) |
| F16L 23/00 | (2006.01) |
| F16L 59/18 | (2006.01) |
| G01M 3/18 | (2006.01) |

(52) U.S. Cl.
CPC ............... *F16L 23/04* (2013.01); *F16L 23/006* (2013.01); *F16L 59/184* (2013.01); *G01M 3/002* (2013.01); *G01M 3/18* (2013.01); *F16L 2201/30* (2013.01)
USPC .................... 137/312; 137/557; 73/46; 374/4; 285/13

(58) Field of Classification Search
CPC .............................. F16L 23/167; F16L 2201/30
USPC ....... 137/312, 557; 73/49.5, 49.1, 40.5 R, 46; 374/4; 285/13
See application file for complete search history.

(56) References Cited

U.S. PATENT DOCUMENTS

| 2,417,741 | A | * | 3/1947 | Dillon ............................ 285/373 |
| 2,571,236 | A | | 10/1951 | Hamilton, Jr. |
| 2,817,230 | A | * | 12/1957 | McCully ........................... 73/46 |
| 3,006,048 | A | * | 10/1961 | Windish ......................... 24/16 R |
| 3,299,417 | A | | 1/1967 | Sibthorpe |
| 3,307,574 | A | * | 3/1967 | Anderson ...................... 137/312 |
| 3,371,521 | A | * | 3/1968 | Hauk ................................ 73/46 |
| 3,744,825 | A | * | 7/1973 | Cooper et al. ................ 285/407 |
| 3,871,209 | A | | 3/1975 | Hasa |
| 4,429,566 | A | * | 2/1984 | Armell et al. .................. 73/40.7 |
| 4,613,163 | A | * | 9/1986 | Grosshandler .................. 285/27 |
| 4,671,675 | A | | 6/1987 | Arisi et al. |
| 4,750,189 | A | | 6/1988 | Lancaster et al. |

(Continued)

FOREIGN PATENT DOCUMENTS

| CA | 2478729 | 12/2005 |
| CH | 682416 | 9/1993 |

(Continued)

OTHER PUBLICATIONS

International Search Report for PCT international patent application No. PCT/US11/01288 issued Jan. 19, 2012.

*Primary Examiner* — Eric Keasel
(74) *Attorney, Agent, or Firm* — Richard D. Harris; Greenberg Traurig, LLP (57) ABSTRACT

A leak detector for an insulated duct carrying pressurized hot air comprises a cover secured over a circumferential cut in the insulation of the duct, or over a joint connecting duct sections, thereby creating a reservoir of hot air which has leaked from the duct or joint, a manifold block defining a conduit therein in communication with the hot air reservoir and a cap for securing heat sensitive wires to manifold at the end of the conduit such that the hot air from the hot air reservoir impinges directly on the heat sensitive wires. The leak detector includes flow control mechanisms in the body of the manifold block, to prevent false alarms arising from nominal leakage resulting from ordinary operation of the duct system.

9 Claims, 11 Drawing Sheets (56) References Cited

U.S. PATENT DOCUMENTS

| | | | | |
|---|---|---|---|---|
| 4,775,855 | A | * | 10/1988 | Cox .............................. 340/605 |
| 4,874,007 | A | * | 10/1989 | Taylor ........................... 137/312 |
| 4,926,680 | A | | 5/1990 | Hasha et al. |
| 5,067,094 | A | * | 11/1991 | Hayes ............................. 702/51 |
| 5,176,025 | A | | 1/1993 | Butts |
| 5,330,720 | A | * | 7/1994 | Sorbo et al. ..................... 422/98 |
| 5,411,162 | A | * | 5/1995 | Koziczkowski et al. ...... 220/320 |
| 5,669,419 | A | * | 9/1997 | Haas ............................. 137/895 |
| 5,969,618 | A | | 10/1999 | Redmond |
| 6,000,104 | A | * | 12/1999 | Mann ......................... 24/274 R |
| 6,354,140 | B1 | | 3/2002 | Farkas et al. |
| 6,498,991 | B1 | | 12/2002 | Phelan et al. |
| 6,799,452 | B2 | | 10/2004 | Brunet et al. |
| 6,860,527 | B2 | * | 3/2005 | Wagner et al. ................ 285/420 |
| 7,155,961 | B2 | | 1/2007 | Fernandes et al. |
| 2008/0264081 | A1 | | 10/2008 | Crowell et al. |
| 2010/0032606 | A1 | | 2/2010 | Strobel et al. |
| 2010/0037974 | A1 | * | 2/2010 | Fernandes et al. ............ 138/141 |

FOREIGN PATENT DOCUMENTS

| | | |
|---|---|---|
| DE | 32 46 227 | 12/1982 |
| EP | 0 240 620 | 10/1987 |
| EP | 1 602 910 | 7/2005 |
| GB | 2 226 417 | 6/1990 |
| RU | 2 365 811 | 2/2006 |
| SU | 1164511 | 6/1983 |
| SU | 1839237 | 1/1990 |
| WO | WO 01/44773 | 6/2001 |
| WO | WO 02/088656 | 11/2002 |

* cited by examiner

JOINT COVER WITH MANIFOLD FOR DUCT LEAK DETECTION SYSTEM

FIELD OF THE INVENTION

This invention is related to the field of aerospace, and, in particular, to modern aircraft which utilize the flow of hot compressed bleed air from the engines for various on-board functions.

BACKGROUND OF INVENTION

The present invention relates to the use of ducting systems in aircraft structures. Amongst the prior art, it is well known in the art to use high temperature bleed air from the engines for various on-board purposes in a modern aircraft. Typically, a stream of hot air bled from the engines is used to provide an anti-icing function on the leading edge of the wings and empennage of the aircraft and is also used by the air conditioning units to supply fresh air to the passenger cabin. The bleed air must therefore be transported from the engines to various other areas of the aircraft, and this is typically accomplished utilizing insulated metallic ducts ranging in diameter from 1.00" to 6.50" and ranging in length from at least 6". The air in the duct can reach pressures up to 450 psig and temperatures of 1200° F., but is typically at a pressure of 60 psig and 800° F. in temperature.

The ducts carrying the engine bleed air are insulated to prevent damage to the aircraft. An insulation blanket is wrapped around the exterior of the duct. This insulation blanket may be composed of a material of the type sold under the tradename Q-Felt® and manufactured by the Johns-Manville Corporation of Denver, Colo. The insulation blanket is capable of lowering the exterior temperature of the duct from 800° F. to about 400° F. or less. A fiberglass impregnated silicon-rubber, textured metal foil, or fiberglass impregnated polyimide resin insulation shell is then wrapped around the exterior of the duct to contain the insulation blanket.

The ducts of the type mentioned can develop leaks from the cracking of the inner metallic duct. If such cracks go undetected, catastrophic failure of the duct can result. Therefore, it is necessary to have sensors positioned along the length of the duct to detect any leakage from the duct.

Prior art leak detection sensing systems consisted of a vent disk, which is a disk having a hole therein, which allowed a stream of hot air to escape the silicon-rubber, texturized foil, or polyimide resin insulation shell. In the event that a duct developed a crack, hot bleed air will flow from the metallic duct wall through the insulation blanket and to the vent disk, then through the hole in the vent disk. The vent disk hole is designed to spread the flow of hot air in a cone-like spray pattern impinging on a pair of heat detection wires spaced approximately 1.0" apart and positioned approximately 1.00" to 1.75" from the outer circumference of the duct. The heat detection wires are of the type sold under the tradename Firewire® and manufactured by Kidde Graviner Limited of the United Kingdom. The heat sensing wires which change their electrical characteristics when exposed to a predetermined temperature. In the case of typical prior art systems used in aircraft, the detection circuit will trip when the wire is exposed to a temperature of approximately 255° F. It is required that both wires of the pair of wires in proximity to the duct be exposed to this temperature before an alarm will be raised to the pilot of the aircraft, to prevent false alarms.

It is desirable that the leak detectors be able to detect a leak in the metallic duct through a crack having the equivalent area of a 5 mm diameter hole. In practice, it has been found that the prior art leak detection systems fail to detect such leaks. The primary reason for the failure of the prior art design is that there is insufficient air flow through the vent disk hole. This results in the hot air stream having insufficient temperature to trip the heat detection wires. First, the temperature of the hot air through the leakage in the metal duct is significantly reduced as the hot air passes through the insulation blanket. Second, the insulation blanket impedes the passage of the hot air from the site of the leak to the vent disk hole, underneath the silicon-rubber, texturized foil, or polyimide resin insulation shell. Further, it has been found that, by the time the air has traversed the distance between the vent disk hole and the sensor wires, it has fallen to a temperature well below the 255° F. necessary to trip the leak detection wires.

Therefore, it is desirable to improve the design of the leak detection system such that a leak through a crack in the metallic duct having an equivalent area of a 5 mm diameter hole is successfully detected. It is also desirable that the new design be able to be economically retrofitted into existing aircraft. In particular, it is desirable that the same existing sensor wires be used and that it not be necessary to remove the existing insulation and to re-insulate the ducts to install the improved leak detection system.

At the joints between adjacent sections of duct, such as bleed air ducts in aircraft wings, the joints are typically constructed by abutting connection flanges between adjacent duct sections, and then by clamping those connection flanges together through the use of a band clamp or similar mechanism. Because this is a clamped arrangement, and not, e.g., a weld or other sealing structure, a certain amount of leakage is permitted and anticipated. Inasmuch as temperature sensor wires and temperature sensing systems have attained a high degree of sensitivity and responsiveness, it is desirable to provide a bleed leak detection system which is capable of discriminating between the low-level leakage that is part of ordinary and acceptable operating conditions, and the higher-level leakage which indicates either a failure of a joint, or failure of the ducting, not necessarily at the joint but in its vicinity, or even at a distance from the joint.

SUMMARY OF INVENTION

To produce air flow with adequate velocity, the laws of fluid dynamics dictate the necessity for both air pressure and volume. If sufficient air pressure exists at low volume, air flow velocity cannot be sustained once the volume is quickly depleted. If sufficient air volume is present without pressure, there is practically no movement of air from a high to a low pressure environment.

When the metallic duct develops a crack, the hot air leaks from duct interior to the insulation blanket. The insulation blanket changes the characteristics of the hot air leakage 1) by absorbing the thermal energy and reducing the air temperature; 2) by reducing the effective pressure due to pressure drop; and 3) by reducing the volume by diffusing the air in the annulus between metal duct and insulation shell throughout the length of the duct.

In one embodiment of the invention, this problem is solved by recapturing or recollecting the degraded air into an air reservoir after the air has passed through the insulation blanket. This is accomplished by circumferentially cutting the insulation shell 360°, at one or more locations along the length of the duct. The circumferential cuts will be covered by installing a "U"-shaped cuff or cover made from multi-ply silicone-rubber impregnated fiberglass cloth centered over each of the circumferential cuts and sealed at both ends to the insulation shell. The cuff re-collects the leakage of degraded hot air and acts as an air reservoir. A vent hole of the proper size and shape, similar to the hole in the vent disc, is provided for the air to be directed to the existing sensor wires. The vent hole will be supported by a silicone rubber pad on the inside of the cuff to stabilize the flow direction of the air through the vent hole. The pressure inside the cuff will begin to rise once the cuff is filled with air. The pressure will reach a steady state value when the flow from the crack in the duct and the flow through the vent hole reach a steady state condition.

With the just-described embodiment of the invention, it has been found, depending upon the distance between the vent hole in the cuff and the sensor wires, that, although there is a steady stream of air being expelled from the vent hole at a temperature sufficient to trip the detector, the air may still have insufficient heat once reaching the sensor wires as the result of its movement between the vent hole and the sensor wires due to a nozzle ejector effect mixing with ambient air around the duct.

In another embodiment of the invention, a manifold has been added between the cuff and the sensor wires to direct the stream of hot air directly from the vent hole to the sensor wires without the loss of heat to the ambient environment. The design of the preferred embodiment comprises adding a manifold block and a manifold cap installed on top of the cuff and inline with the vent hole in the cuff. The manifold block is designed to route the hot air from a single conduit in the manifold, to a "Y" where the conduit divides into two conduits, which lead directly to the sensor sires. Hot air impingement is accomplished by installing a cap on the manifold block that secures each of the sensor wires in a channel groove. The channel groove in the cap for each sensor wire is designed to align with the outlet of the one of the two conduits running through the manifold from the "Y". As such, the hot air flows directly from the vent hole to the sensor wires with sufficient heat to trip the sensor wires.

In yet another improved embodiment of the invention, for applications in which the temperature sensor wires, and manifold, are located above, or in the immediate vicinity of a clamped joint between adjacent duct sections, the manifold is located in a structure referred to as a coupling cover, which is typically clamped in place over and around the joint between adjacent duct section ends. In this embodiment, the leak detection system sensitivity issue discussed hereinabove is addressed through the use of a flow control mechanism in the manifold, to accommodate the allowable "leakage" which is expected and acceptable at such locations. The use of a flow control mechanism in the manifold block enables the leak detection system to differentiate between the maximum allowable leakage that is part of ordinary operation from leakage that is indicative of actual structural failure. Accordingly, an embodiment of the present invention incorporates a mechanism for providing this desired discrimination, in the form of a valve structure disposed within the manifold block, to prevent duct gases from impinging on the temperature sensitive wires of the temperature sensor system, unless the duct gases are at such a pressure, as to override the valve structure, and thus confirm their source as being a structural failure.

While the aforementioned flow control mechanism or valve structure may typically be employed in manifold blocks located above or in the immediate vicinity of joints between adjacent duct sections, in yet alternative improved embodiments of the invention, the manifold blocks located at positions further removed from joints between duct sections, i.e., in manifold blocks located in the previously-mentioned cuffs, may also be provided with such flow control mechanisms, if desired.

Accordingly, the present invention comprises, in part, a joint cover apparatus, for a ducting system for transporting high temperature pressurized gases, for covering a joint between adjacent duct sections, wherein the ducting system is provided with a leak detection system using one or more temperature-responsive sensor wires The joint cover apparatus may comprise a split joint cover body, operably configured to be expanded, to permit the split joint cover body to be positioned circumferentially around a joint between adjacent duct sections, the split joint cover body having an aperture therethrough, to permit the passage of gases emanating from the joint to a location external to the split joint cover body. At least one clamping mechanism may be provided to releasably engage the split joint cover body, to cause the split joint cover body to be contracted around the joint.

In these embodiments, a manifold block may be positioned within the aperture of the split joint cover body, for maintaining the at least one sensor wire in fixed position, relative to the aperture in the split joint cover body, for directing gases emanating from the joint into contact with the sensor wires, the manifold block having one or more gas passages disposed therein to conduct gases through the block and into contact with the one or more temperature-responsive sensor wires. The manifold block further may have a flow control mechanism for controlling flow of gases through the one or more gas passages to preclude the flow of gases through the one or more gas passages when the gases emanating from the joint have a pressure that is below a preselected numerical value.

The present invention also comprises, in part, a manifold block, for a ducting system for transporting high temperature pressurized gases, for placement in a cover surrounding at least part of at least one duct section in the ducting system, wherein the ducting system is provided with a leak detection system using one or more temperature-responsive sensor wires.

The manifold block may comprise a manifold block body. Sensor wire notches may be formed in the manifold block body for restrainably receiving temperature-responsive sensor wires. Gas passages may be disposed in the manifold block body and extending along a fluid path from an interior-facing surface of the manifold block body to an exterior facing surface of the manifold block body, the gas passages intersecting the sensor wire notches. A flow control mechanism may be disposed in the fluid path between the interior-facing surface and the exterior-facing surface, for controlling flow of gases through the gas passages to preclude the flow of gases through the gas passages when the gases have a pressure that is below a preselected numerical value.

DETAILED DESCRIPTION

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extend that any numerical values or other specifics of materials, etc., are provided herein, they are to be construed as exemplifications of the inventions herein, and the inventions are not to be considered as limited thereby.

Figure 6:
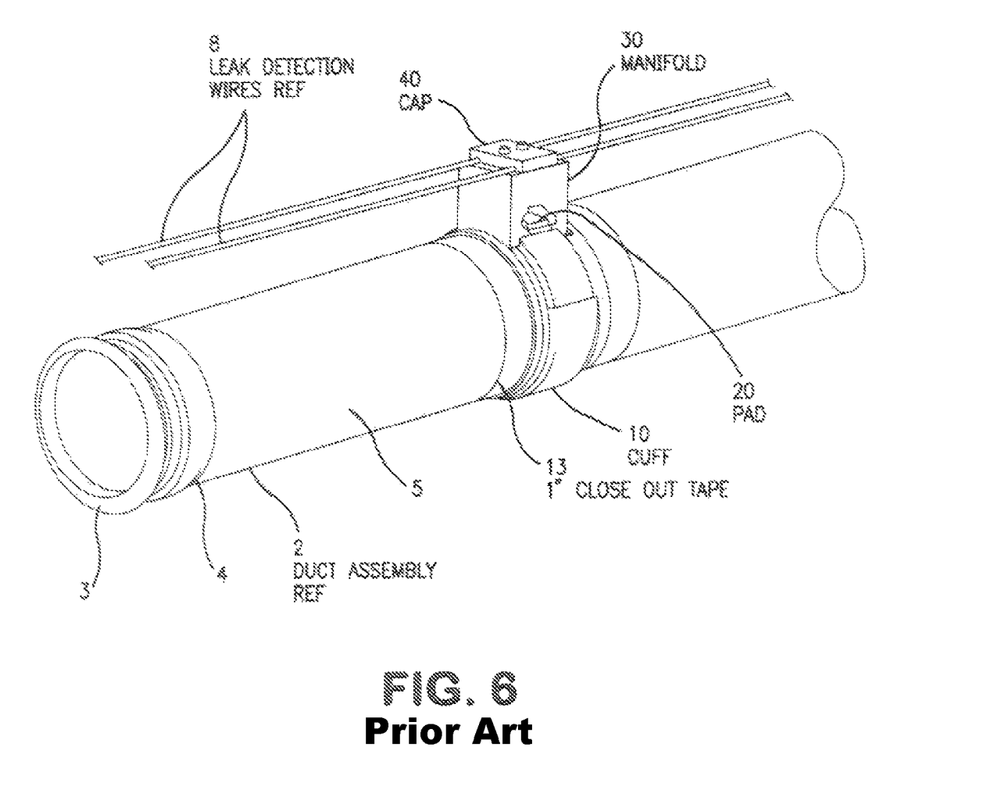
FIG. 6 shows the preferred embodiment of the invention installed on a duct.

A typical duct assembly 2 of the type with which the invention is intended to be used is shown in FIG. 6 and comprises an inner metal duct 3, typically composed of steel and 1.00" to 6.50" in diameter, covered by insulation blanket 4, and secured by outer insulation shell 5. Insulation blanket 4 and outer insulation shell 5 are composed of materials as previously discussed.

Figure 1:
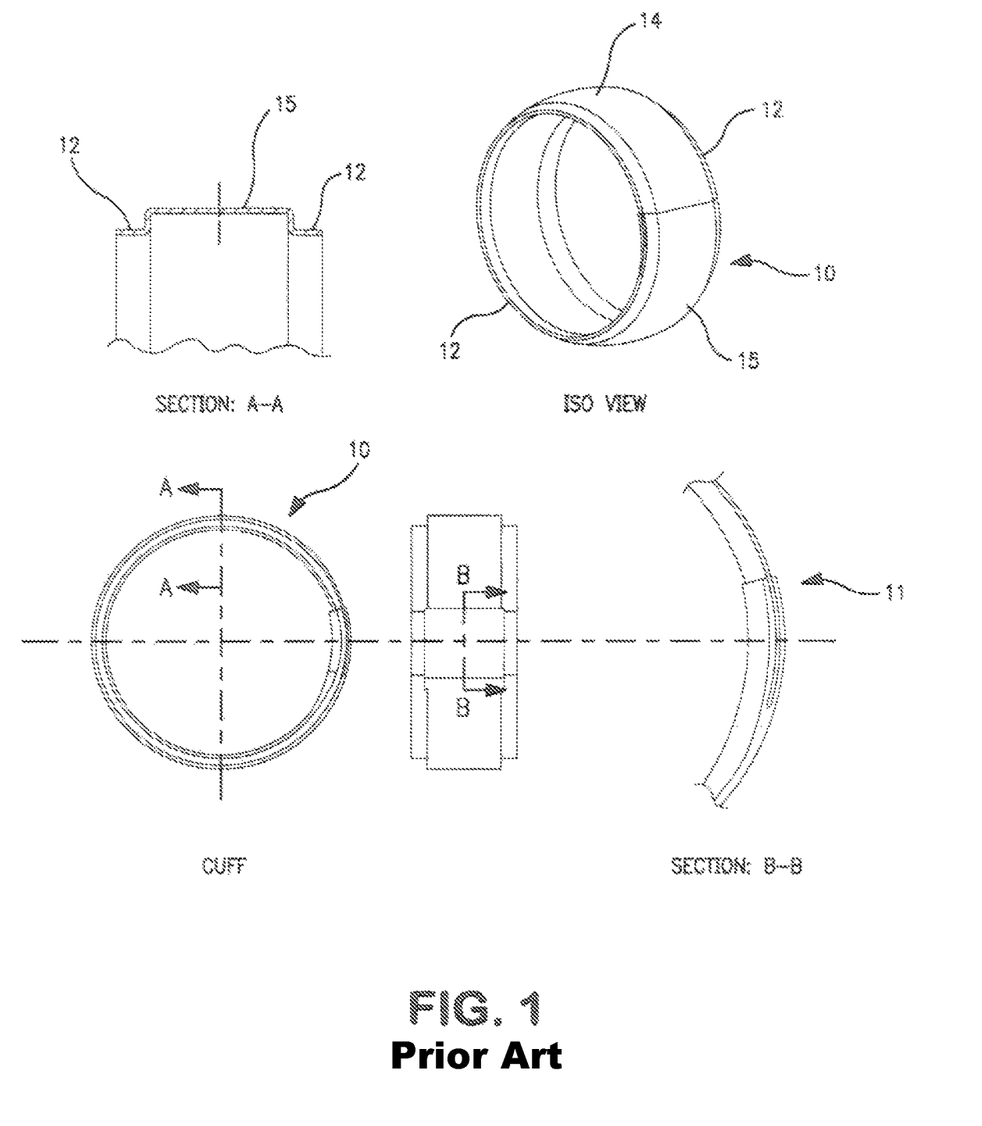
FIG. 1 shows side, cross sectional and isometric views of the cuff.

FIG. 1 shows the cuff 10 portion of the invention. Cuff 10 is positioned circumferentially around outer insulation shell 5 of duct assembly 2 as shown in FIG. 6. Preferably, cuff 10 is composed of multiple plies of silicon rubber impregnated with fiberglass (to limit stretch), and, in the most preferred embodiment, three plies are used to avoid having cuff 10 rupture due to excessive pressure build-up when installed in situ around duct assembly 2. Before securing cuff 10 to duct assembly 2, at least outer insulation shell 5 is cut circumferentially around duct assembly 2. A small amount of outer insulation shell 5 may also be removed to form a narrow gap in outer insulation shell 5.

To secure cuff 10 to duct assembly 2, cuff 10 is situated circumferentially around the portion of duct assembly 2 in which the cut in outer insulation shell 5 has been made, and the tongue and groove arrangement 11, as shown in FIG. 1, at the ends of cuff 10 are engaged.

Figure 2:
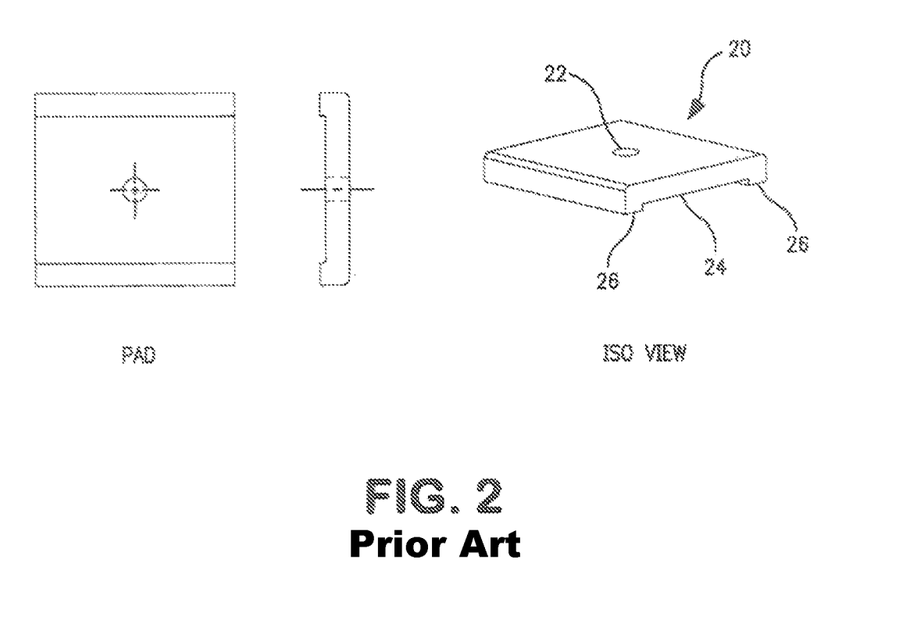
FIG. 2 shows top, side and isometric views of the pad.

FIG. 1, section A-A, shows a cross sectional view of cuff 10 showing a raised middle portion 15 with shoulders 12 on either side thereof. Shoulders 12 will rest against outer insulation shell 5 of duct assembly 2, while raised middle portion 15 remains above insulation shell 5, thereby defining an annular-shaped void thereunder. Cuff 10 is secured to duct 2 by wrapping shoulders 12 and the adjoining area of outer insulation shell 5 with a heat-resistant, silicon-rubber compound tape, 13, as shown in FIG. 6. One example of an appropriate heat-resistant, silicon-rubber tape 13 is sold under the trade-name MOX-Tape™ and manufactured by Arlon Corporation of Santa Ana, Calif. In lieu of heat resistant tape 13, any known method of securing cuff 10 to duct assembly 2 may be used, as long as the passage of air through insulation layer 4 to the void under cuff 10 is not restricted. Cuff 10 should be situated on duct assembly 2 such that hole 14 is in a convenient orientation with respect to the position of existing sensor wires 8 such that air escaping hole 14 will impinge on both of the sensor wires 8. Because pressures within the inner metal portion 3 of duct assembly 2 can reach up to 60 psig, it can be expected that pressure within the void created between cuff 10 and duct assembly 2 may also experience similar pressures. As a result, it is possible that middle portion 15 of cuff 10 may deform because of bowing due to pressure buildup in the void inside cuff 10. As a result, it is possible that hole 14 may not direct the air escaping therefrom to impinge onto sensor wires 8 when middle portion 15 of cuff 10 is deformed. Therefore, to assist in keeping hole 14 pointed toward sensor wires 8, pad 20 is situated on the inside of cuff 10 between cuff 10 and outer insulation shell 5 of duct assembly 2. Pad 20 is configured with two "legs" 26 which may rest on the outer surface of duct assembly 2 and channel 24 between legs 26 which has been provided to allow pressurized air within the void created by cuff 10 to reach the underside of hole 22. Pad 20 is adhered to the inner surface of cuff 10 using any means known in the prior art, such as with room temperature vulcanizing silicon rubber (RTV) adhesive sold by Dow-Corning. Pad 20 is composed of a flexible silicon rubber compound having a durometer of between 20 and 50 Shore hardness, such that pad 20 should align with hole 14 in cuff 10 such that air can flow from the void created by cuff 10 through channel 24, hole 22 and out of hole 14.

The configuration of cuff 10 and pad 20 comprise one embodiment of the invention which is functional as long as sensor wires 8 are in close enough proximity to the outer surface of cuff 10 such that the air being forced from hole 14 has enough heat by the time it impinges on sensor wires 8 such as to trip the detector. This temperature is approximately 255° F. In the event that sensor wires 8 are too far away from duct 2 to be tripped by the escaping air, then the second, and preferred, embodiment of the invention may be used.

Figure 3:
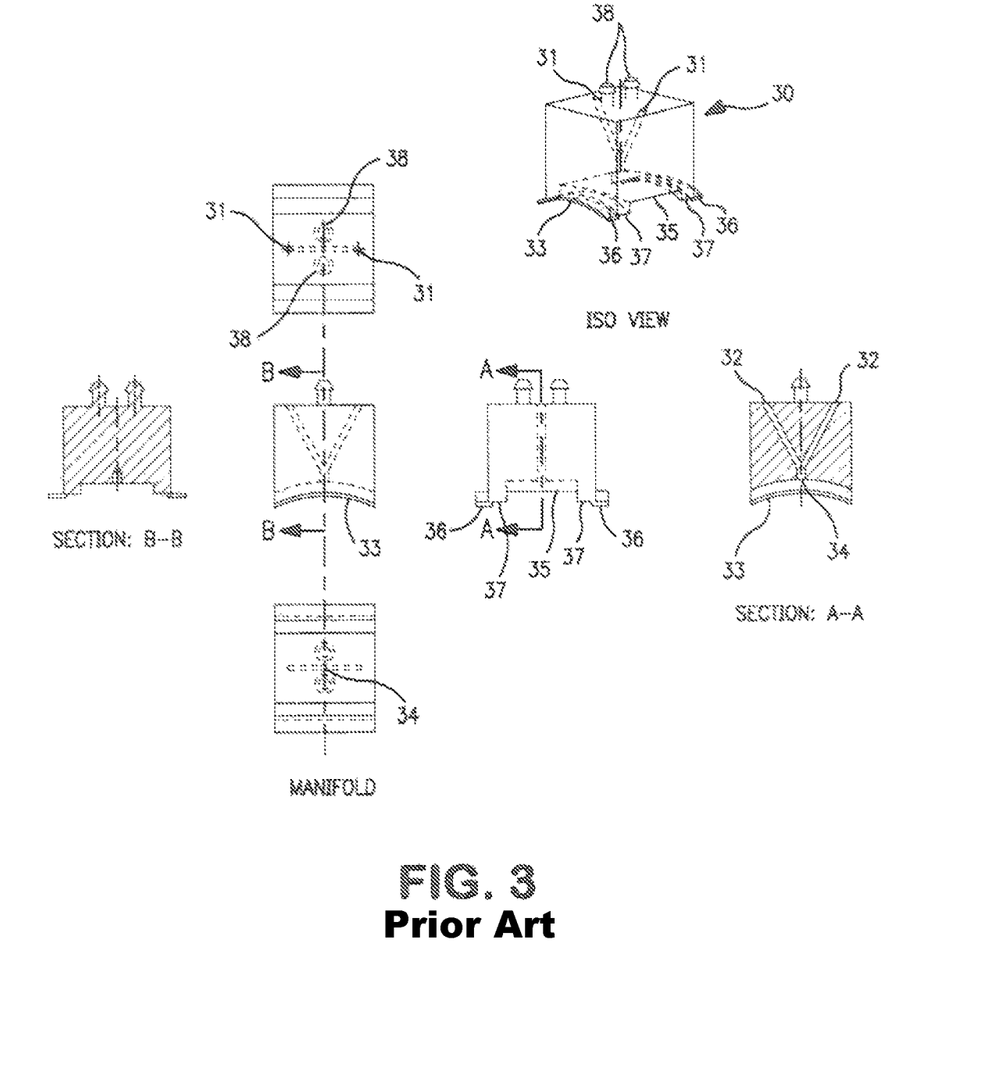
FIG. 3 shows top, bottom, side, cross sectional and isometric views of the manifold block.
Figure 4:
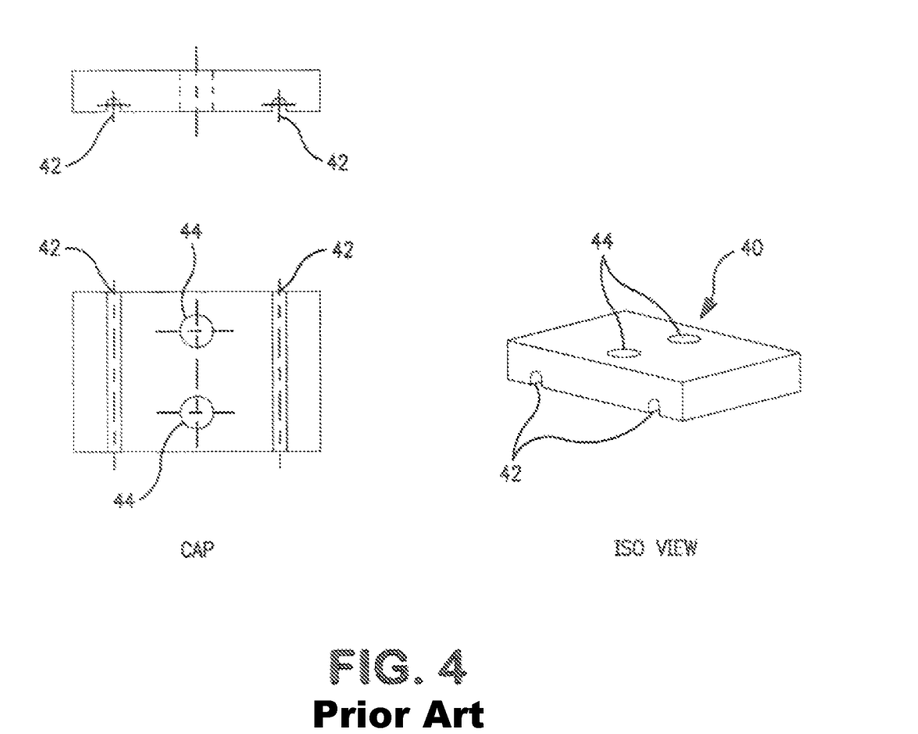
FIG. 4 shows top, side and isometric views of the cap.
Figure 5:
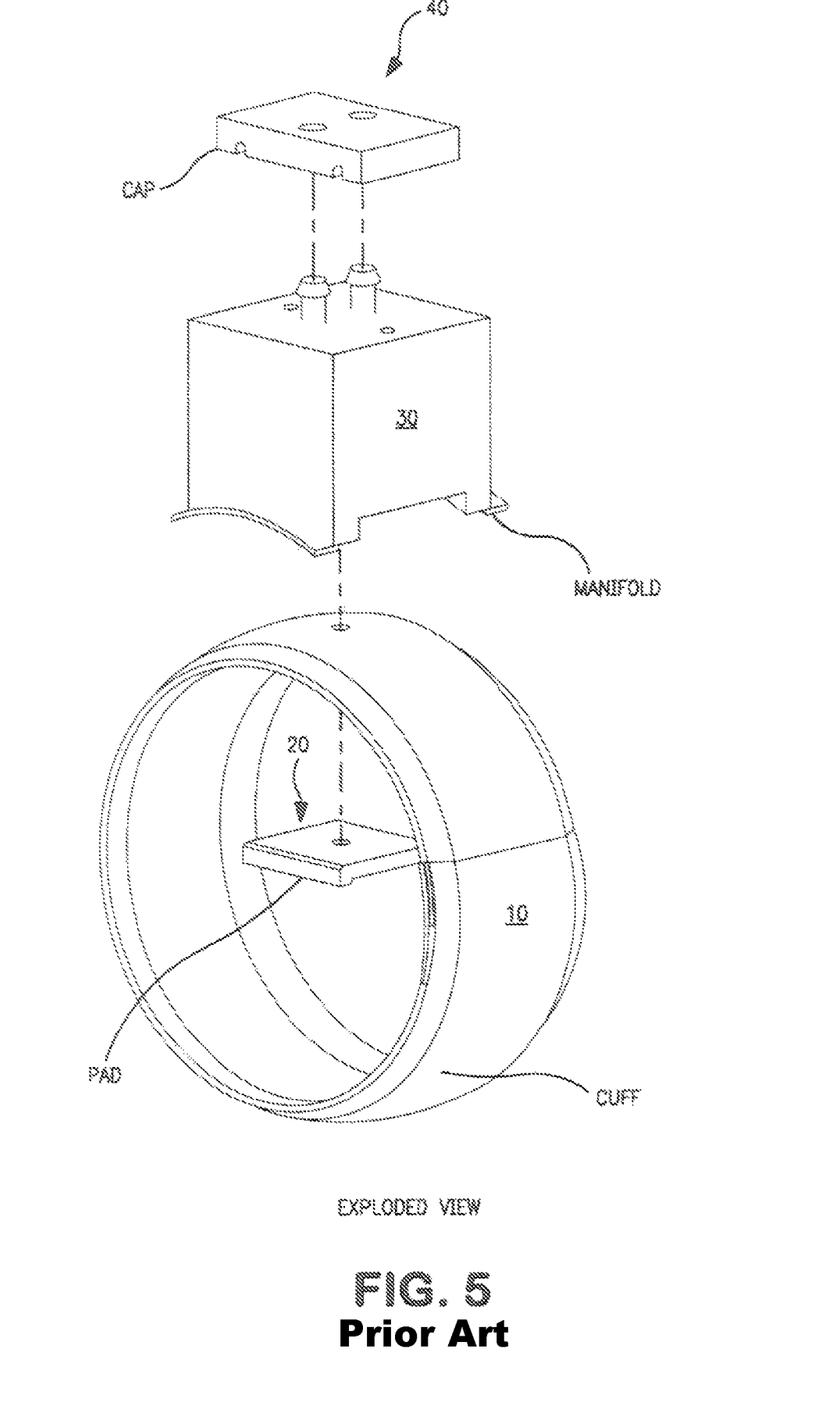
FIG. 5 shows an exploded view of the invention showing the cuff pad, manifold and cap and their placement with respect to each other.

The preferred embodiment of the invention includes cuff 10 and pad 20 already discussed in addition to manifold block 30 and cap 40. Manifold block 30 is shown in various views in FIG. 3 and in situ in FIG. 6. Manifold 30 is a block of silicon rubber compound having channels defined therein to route the air from hole 14 in cuff 10 directly to sensor wires 8, which will be captured by channels 42 in cap 40 at the top of manifold block 30.

Manifold block 30 is provided with a defined radius 33 on the bottom thereof which matches the outer radius of cuff 10 when in place on duct assembly 2. Naturally, radius 33 will vary depending upon the size of duct assembly 2 upon which cuff 10 is installed. The bottom of manifold block 30 is also configured to match the outer shape of cuff 10. Shoulders 37 on the bottom of manifold block 30 will sit in shoulders 12 on cuff 10 and channel 35 will accept the raised middle portion 15 of cuff 10. Wings 36, defined on the outer edges of manifold block 30 at the bottom thereof, extend past the outer edge of cuff 10 and are used to secure manifold block 30 to cuff 10 through the use of heat-resistant tape 13 of the same type used to secure cuff 10 to the outside of duct assembly 2.

Defined within manifold 30 is a conduit 34 which, when manifold block 30 is place over cuff 10, aligns with hole 14 in cuff 10. Conduit 34 splits into two separate conduits 32 which extend to the top of manifold block 30 and emerge through holes 31 defined thereon, thereby forming a "Y" shaped conduit in the interior of manifold block 30. Sensor wires 8 are captured in channels 42 of cap 40, which lock them into place directly above holes 31. Posts 38 defined on the top of manifold block 30 are used to hold cap 40 in place and to keep sensor wires 8 positively aligned with holes 31 in manifold 30, thereby allowing hot air coming from conduits 32 through holes 31 to impinge directly on sensor wires 8, without the loss of heat experienced in the prior art when the hot air was forced through an environment of much lower temperature.

Holes 44, defined in cap 40, mate with posts 38 disposed on the top of manifold block 30, to form a snap type fitting to secure cap 40 firmly in place on the top of manifold block 30 without the use of tools. Manifold block 30 is preferably composed of a silicon rubber compound having a durometer reading between 65 and 85. Alternatively, manifold block 30 may be made of other materials, such as aluminum, however, care must be taken to avoid excessive heat transfer through the metal body of manifold block 30 such as to lower the temperature of the hot air emerging from holes 31. Also, preferably, cap 40 will be softer than manifold block 30, having a durometer reading of between 30 and 50 Shore hardness, such that the cap can be removed from snap posts 38 without damaging the manifold block.

Tests of this design were conducted in a lab wherein an original prior art vent disk design and the design of the embodiments of the invention disclosed herein were installed adjacent to one another on a duct assembly. A partial cut measuring approximately 0.025" wide by 1.25" long was made in the metal portion 3 of duct assembly 2 to simulate a crack-like failure having an area equivalent to a 5 mm diameter hole, and the metal portion 3 of duct assembly 2 was pressurized. The air flow through the original vent disk was undetectable, while the air flow through vent 14 in cuff 10 was of significant velocity throughout a range of duct pressures ranging from 5 psi to 40 psi. The pressure in the void created by cuff 10 was measured and was found to be approximately 12% of the pressure in the metal portion 3 of duct assembly 2. The pressure combined with the volume in cuff 10 provided a visual and a measurable flow of air through vent hole 14 in cuff 10, thereby meeting the objective of the invention.

FIGS. 7-16 illustrate an improved alternative embodiment of the invention, wherein the manifold block incorporates a check valve. In ducting structures of the type described herein, the specifications for the ducts allow for a small amount of leakage, particularly at the locations where two sections of duct are joined together by a coupling. Accordingly, in order to prevent false alarms resulting from such small, accounted for leakage, it is desirable to provide a way to prevent leaking gases from reaching the highly sensitive temperature sensing wires, unless the volume and/or pressure of the leaking gases exceeds a preselected value.

Therefore, coupling covers employed in accordance with the principles of the present invention, particularly those covering duct couplings, may be provided with a check valve, which is biased in a closed position, against leakage gas pressures which are below a preselected threshold level.

Figure 7:
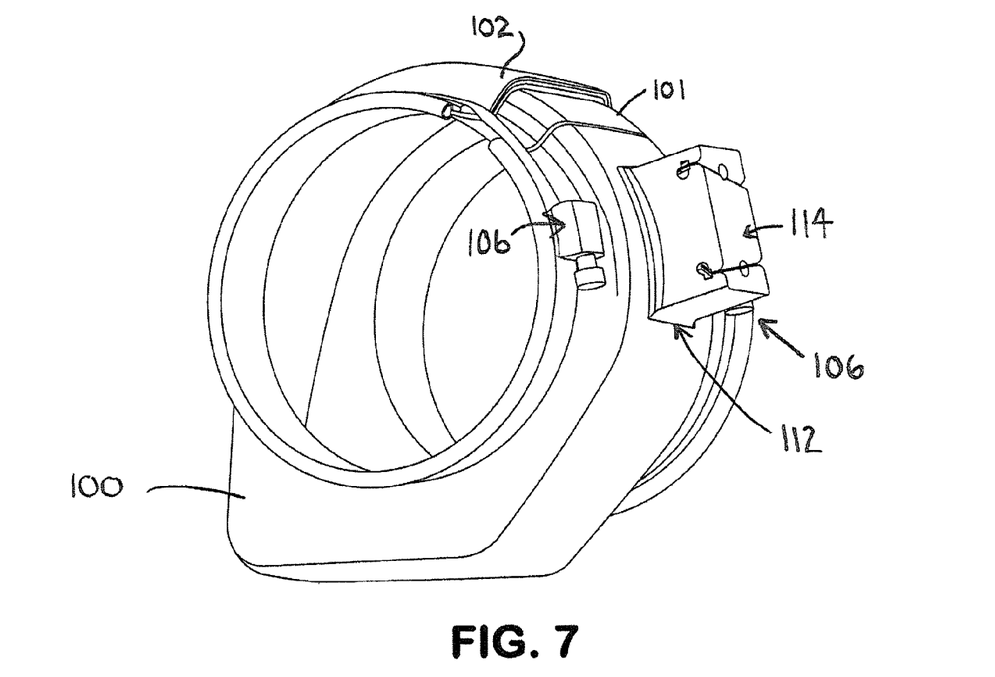
FIG. 7 is a perspective view of an improved embodiment of the invention showing a cuff/coupling cover with integrated manifold block.

Coupling cover 100 is shown in perspective view in FIG. 7, in the form of a split ring, having, at the split, a first inner portion 101 that is overlapped by a second outer portion 102 in the vicinity of the split. First inner portion has wedge-shaped or ramp-shaped outer contours. Coupling cover 100 is held in place by band clamps 106. Each band clamp may be in the form of a conventional hose-type clamp, having a band 108, and a screw drive section 110. As band clamps 106 are tightened, second outer portion 102 is forced to ride up first inner portion 101, creating a binding fit, so as to inhibit leakage of gases therebetween. Coupling cover 100 is preferably fabricated from silicone rubber impregnated fiberglass cloth, which may be pre-molded, and cured in a temperature-controlled environment. Opening 112 in coupling cover 100 permits manifold block 114 to be inserted therethrough from the inside, and held in place, e.g., by an RTV ("Room Temperature Vulcanization") adhesive. In preferred embodiments of the invention, coupling cover 100 is fabricated from the same material and cured in the same manner as cuff 10.

Figure 8:
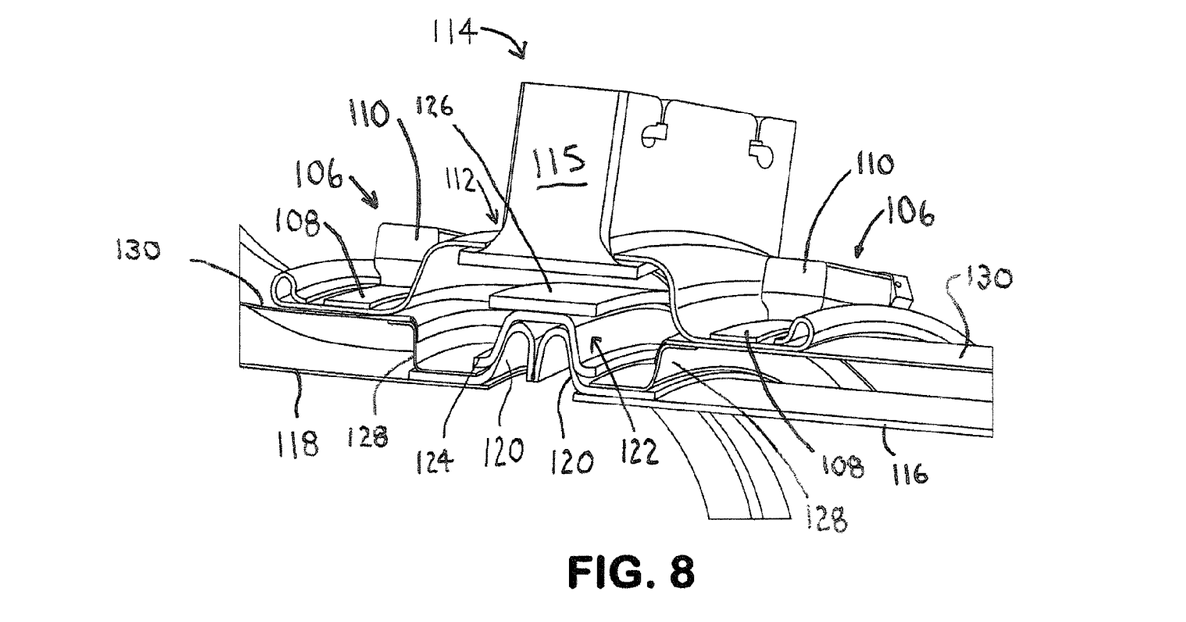
FIG. 8 is a perspective view, in section, of the cuff/coupling cover with integrated manifold block, according to the embodiment of FIG. 7.

FIG. 8 is a lengthwise or longitudinal sectional view of a duct joint surrounded by a coupling cover 100 according to the this embodiment of the invention. Duct sections 116, 118 are connected to one another by joint flanges 120 affixed to the ends of the respective duct sections 116, 118. Joint flanges 120 are, in turn, held together by V-band coupling 122, formed from V-band 124 and strap 126. V-band coupling will have a screw drive section (not shown), such as used with band clamps 106, to tighten strap 126, to create radially inwardly directed clamping pressure against flanges 120. Standoffs 128 are used to provide radial spacing between duct sections 116, 118, and insulation shells 130. Insulation (not shown) may typically be provided in the annular gap between insulation shells 130 and duct sections 116, 118.

Figure 9:
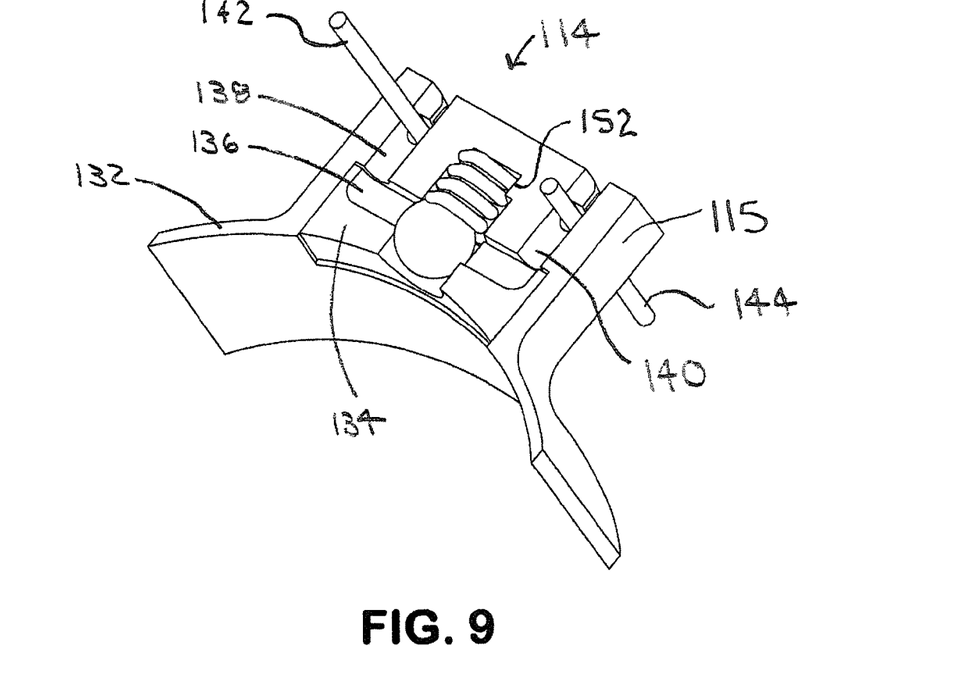
FIG. 9 is a perspective view, in section, of the manifold block according to the embodiment of FIGS. 7 and 8, showing the leakage flow check valve.
Figure 10:
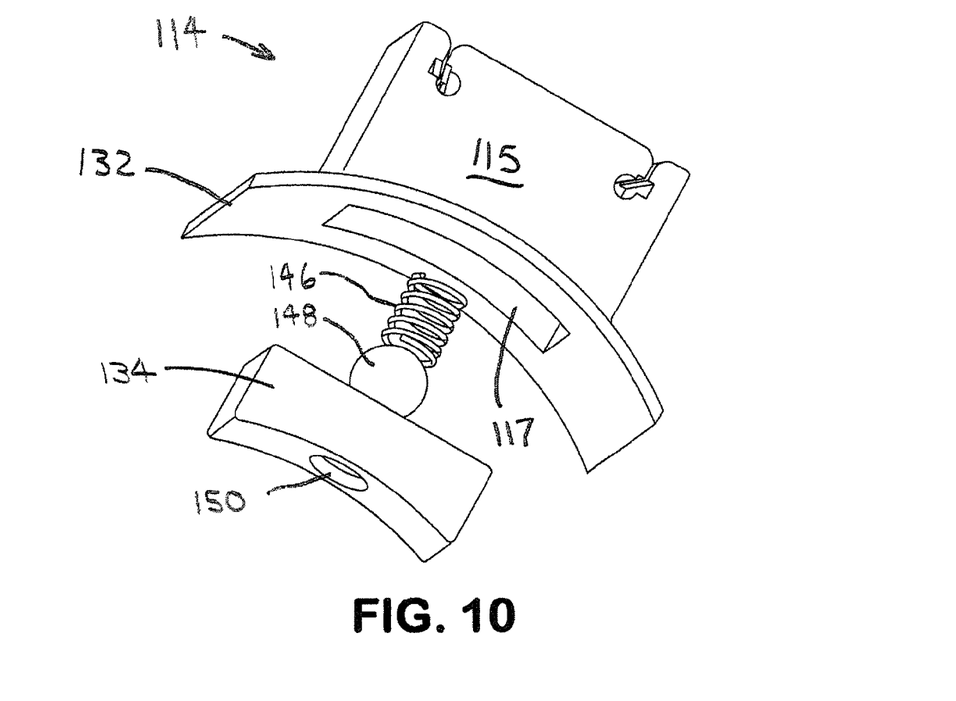
FIG. 10 is a perspective exploded view of the manifold block of FIGS. 8 and 9.
Figure 11:
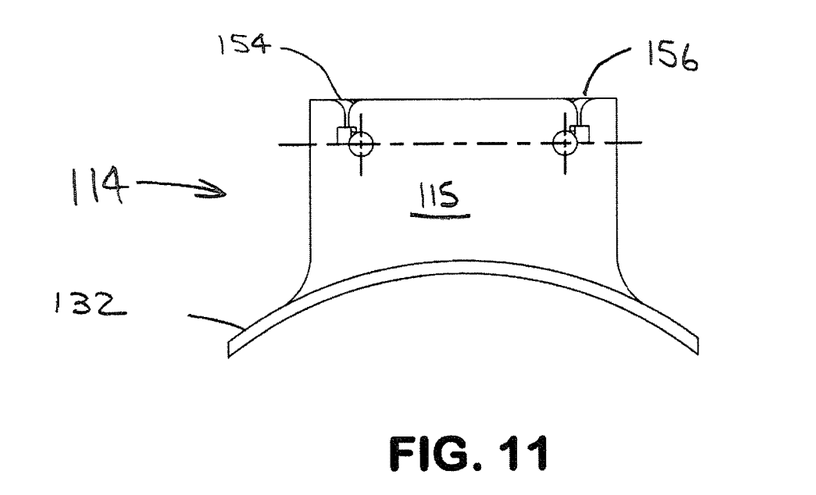
FIG. 11 is a side elevation of the manifold block of FIGS. 8-10.
Figure 12:
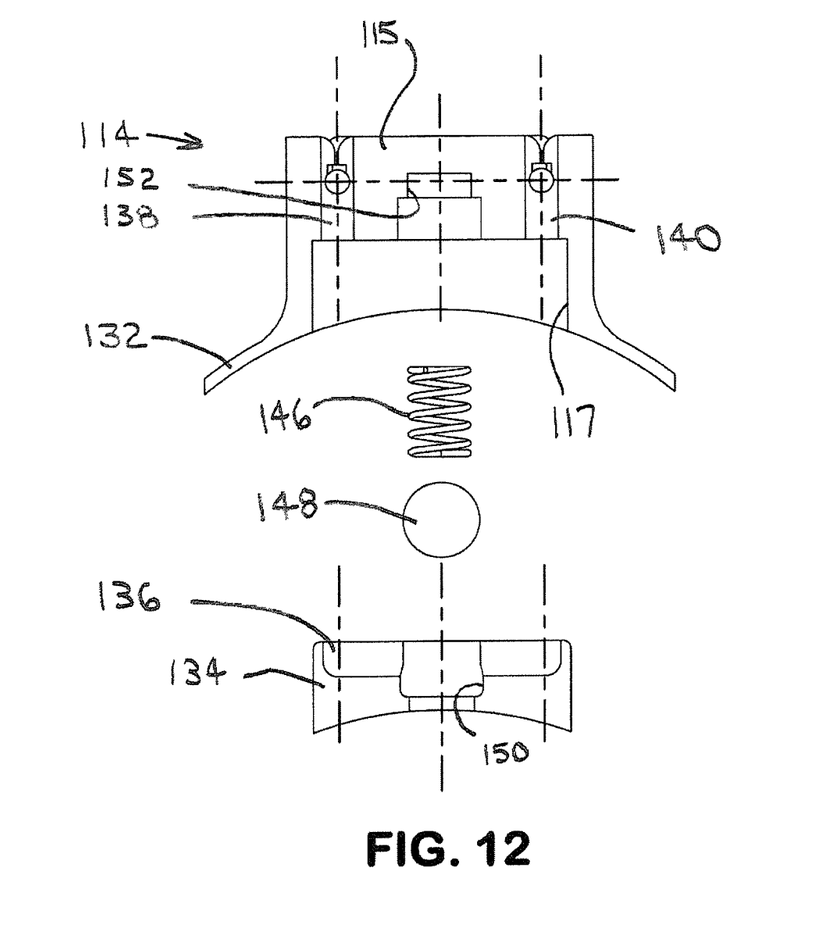
FIG. 12 is an exploded side elevation, in section, of the manifold block of FIGS. 8-11.
Figure 13:
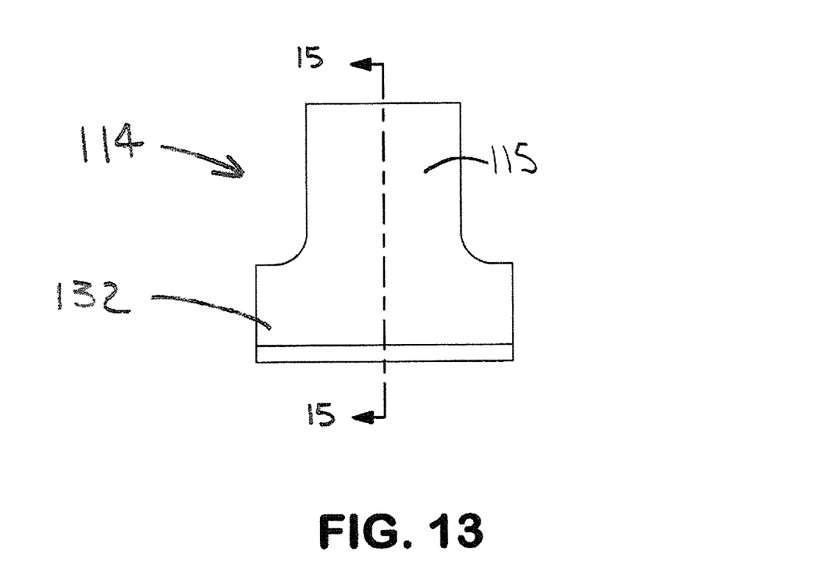
FIG. 13 is an end elevation of the manifold block of FIGS. 8-12.
Figure 14:
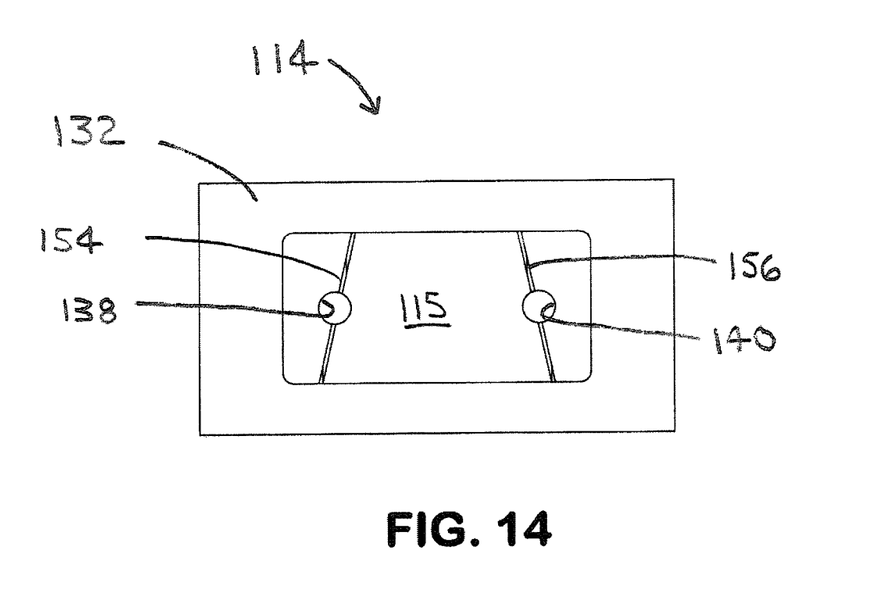
FIG. 14 is a top view of the manifold block of FIGS. 8-13.
Figure 15:
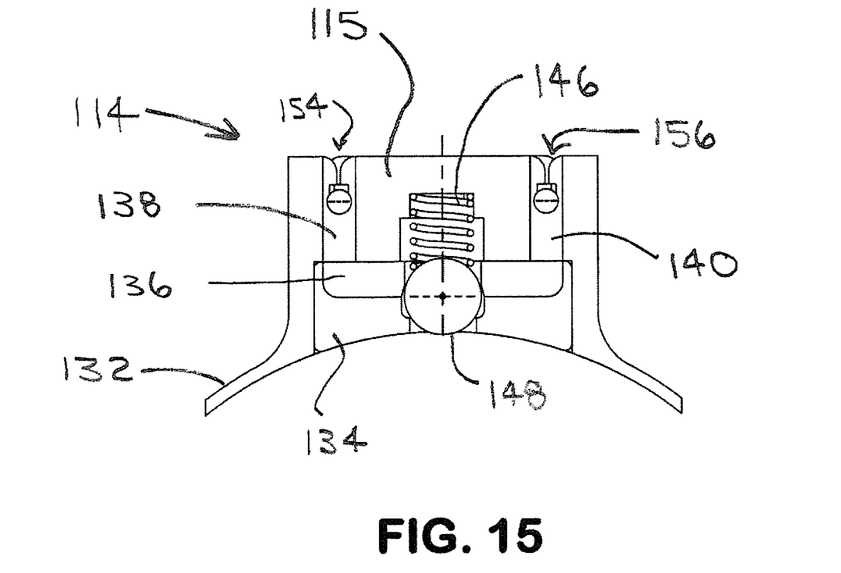
FIG. 15 is a side elevation, in section, of the assembled manifold block of FIG. 13, taken along line 15-15 thereof.
Figure 16:
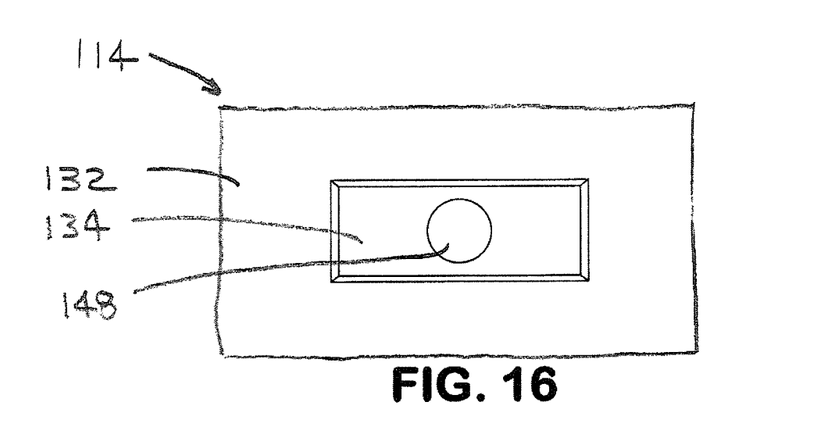
FIG. 16 is a bottom view of the assembled manifold block of FIGS. 8-15.

FIG. 9 is a transverse sectional view of manifold block 114. Manifold block 114 incorporates block body 115, from which emanates block flange 132 to provide overlap surface area between manifold block 114 and the surrounding coupling cover 100, for placement of a suitable adhesive material, to permanently affix manifold block 114 to coupling cover 100. Manifold block 114 is preferably fabricated from silicone rubber.

To assemble manifold block 114, coil spring 146 is inserted into coil spring pocket 152, followed by the insertion of valve ball 148. Block insert 134, which is preferably fabricated also from silicone rubber, like block body 115, is then inserted into rectangular recess 117 (compressing spring 146 against ball 148 in the process), and held in place by adhesive.

Gas passages 136 in block insert 134, and gas passages 138, 140 in manifold block 114 enable the flow of leakage gases, as described hereinafter. Passages 138, 140 are intentionally configured to be partially obstructed by sensor wires 142, 144 (see FIG. 9), so as to cause any leakage gases to be forced to spread longitudinally along wires 142, 144, to increase the amount of surface area contact made by the gases, to ensure increased exposure time, and thus more accurate sensor wire responses.

Manifold grooves 154, 156, at the top of manifold block 114, extend at an angle to the longitudinal/axial direction of ducts 116, 118. See, e.g., FIGS. 10 and 14. However, within the body of manifold block 114, manifold grooves 154, 156 extend parallel to the longitudinal/axial direction, so as to create ledges or overhangs that serve to lock sensor wires 142, 144 in place within manifold block 114, without having to use a cap or other separate retaining structure to fixedly position sensor wires 142, 144. Fully assembled manifold block 114 is shown in FIGS. 10, 13-16.

In operation, once coupling cover 100 is in place over a duct joint, as sensor wires 142, 144 are strung along the ducting, at each such manifold block 114, the sensor wires are deflected sufficient to align them with grooves 154, 156. Upon full insertion of sensor wires 142, 144 down into grooves 154, 156, the wires reach the portions of grooves 154, 156 which extend parallel to the longitudinal direction of the duct joint, and the overhanging portions of block body 115 that are above wires 142, 144 serve to prevent undesired "popping out" of the wires from the grooves.

As gases begin to flow through the duct joint, a certain amount of gases will escape through the interface between joint flanges 120 and will be exposed to the underside of valve ball 148. Until the pressure of the escaping gases exceeds a certain predetermined value (which may vary from application to application), ball 148 will remain firmly seated, under the biasing action of coil spring 146. Once the predetermined pressure has been exceeded, then ball 148 will be raised off its seat 150, and the gases can enter passages 136, 138, 140, and be conducted into contact with sensor wires 142, 144. Depending upon the temperature which is sensed through action of the impingement of the gases on sensor wires 142, 144, the control apparatus not shown, but which is known to those of skill in the art) may cause a warning signal to be generated and communicated, e.g., to the operator of the aircraft. A series of graduated warnings may even be possible, that would be a function of the gas temperature(s) which are being sensed.

The embodiments disclosed herein are exemplary in nature and are not intended to restrict the scope of the invention. Alternate materials, methods of securing the various parts on the invention, and different configurations and shapes for the cover, manifold block and cap are contemplated as being within the scope of the invention.

The foregoing description and drawings merely explain and illustrate the invention, and the invention is not limited thereto, except as those skilled in the art who have the present disclosure before them will be able to make modifications and variations therein without departing from the scope of the invention.

The invention claimed is:

1. A joint cover apparatus, for aircraft ducting systems that transport high temperature pressurized aircraft exhaust gases for re-use in various on-board functions, the apparatus being utilized to-cover a joint between abutting duct sections, wherein the ducting system is provided with a leak detection system using one or more temperature-responsive sensor wires, the joint cover apparatus comprising:
   a split joint cover body having an annular shape, for covering a joint formed by the ends of abutting duct sections, said duct sections forming a first contained environment, and for collecting gases emanating from the joint between said abutting duct sections;
   said split joint cover body including an internal gas collection region defining a second contained environment, said split joint cover body being positionable circumferentially around the joint between said abutting duct sections, and having an aperture therethrough, to permit the passage of gases from said internal gas collection region to a third contained environment external to the split joint cover body, said leak detection system being positioned within said third contained environment;
   at least one adjustable clamp assembly releasably engaging the split joint cover body to bind the split joint cover body around the joint between said abutting duct sections to inhibit the leakage of said emanating gases from said joint without taping, said at least one adjustable clamp assembly facilitating the removal and replacement of said split joint cover body from the joint;
   said third contained environment including a manifold block, said manifold block being operably connected to the aperture of the split joint cover body, for receiving and redirecting said emanating gases, said manifold block maintaining the one or more sensor wires in fixed position, relative to the aperture in the split joint cover body, for redirecting gases from the second contained environment formed by the internal gas collection region into contact with the sensor wires positioned therewithin said third contained environment, the manifold block having one or more gas passages disposed therewithin to conduct gases through the block and into contact with the one or more temperature-responsive sensor wires;
   said manifold block further including a flow control valve operably positioned between the aperture and the one or more sensor wires to discriminate between acceptable and unacceptable leakage levels, by precluding the flow of gases through the one or more gas passages until said gases reach a pressure corresponding to a preselected numerical value.

2. The joint cover apparatus according to claim 1, wherein the flow control valve comprises a one-way check valve.

3. The joint cover apparatus according to claim 2, wherein the one-way check valve further comprises a spring-biased ball valve.

4. The joint cover apparatus according to claim 1, further comprising:
   a spring-receiving pocket disposed in the manifold block;
   a coil spring disposed in the spring-receiving pocket;
   a ball positioned against the compressed coil spring; and
   a manifold block insert, fixedly received within a recess in the manifold block, and having a gas passage aperture disposed therein, the gas passage aperture having a peripheral edge surface having a diameter less than a maximum diameter of the ball,
   the coil spring being disposed in a partially compressed state, so as to maintain the ball in a substantially fluid-tight position against the peripheral edge surface of the gas passage aperture, so as to preclude the passage of leaking gases through the gas passages in the manifold block, unless the pressure of the gases exceeds a said preselected numerical value.

5. The joint cover apparatus according to claim 1, in which said manifold block further comprises a manifold block flange extending outwardly from the manifold block, for facilitating attachment of the manifold block to the split joint cover body,
   said manifold block flange being positionable within, and securely captured by, a portion of said split joint cover body.

6. A manifold block, for aircraft ducting systems that transport high temperature pressurized aircraft exhaust gases for re-use in various on-board functions, the manifold block for insertion into an opening in a split joint cover, which split joint cover collects gases leaking from within a first contained environment into a second contained environment, and for channeling said leaked gases to a third contained environment external to the split joint cover, said ducting system including a leak detection system using one or more temperature-responsive sensor wires positioned within said third contained environment, the manifold block comprising:
   a manifold block body for positioning within said third contained environment;
   at least one block flange emanating from said manifold block body, said manifold block body being capable of being inserted into and through said opening in said split joint cover, so as to enable the sealed affixation of said manifold block body to said split joint cover;
   exposed portions of said one or more temperature-responsive sensor wires being operably positioned within the manifold block body for monitoring the temperature of leaked gases accumulated within said manifold block body as they are channeled from said second contained environment to said third contained environment; and
   one or more gas passages disposed within the manifold block body and forming a gas path that extends from said cover to said exposed portions of said one or more sensor wires, the gas passages directing said leaked gases to said sensor wires;

said manifold block further comprising a flow control valve operably disposed in the gas path, the flow control valve being used to discriminate between acceptable and unacceptable leakage levels, by precluding the flow of gases through said one or more gas passages until said gases reach a pressure corresponding to a preselected numerical value.

7. The manifold block according to claim 6, wherein the flow control valve comprises a one-way check valve.

8. The manifold block according to claim 7, wherein the one-way check valve further comprises a spring-biased ball valve.

9. The manifold block according to claim 6, further comprising:

a spring-receiving pocket disposed in the manifold block body;

a coil spring disposed in the spring-receiving pocket;

a ball positioned against the compressed coil spring; and a manifold block insert, fixedly received within a recess in the manifold block body, and having a gas passage aperture disposed therein, the gas passage aperture having a peripheral edge surface having a diameter less than a maximum diameter of the ball, the coil spring being disposed in a partially compressed state, so as to maintain the ball in a substantially fluid-tight position against the peripheral edge surface of the gas passage aperture, so as to preclude the passage of leaking gases through the gas passages in the manifold block body, unless the pressure of the high temperature, highly pressurized gases exceeds said preselected numerical value.

* * * * *